US009324498B2

(12) United States Patent
Park et al.

(10) Patent No.: US 9,324,498 B2
(45) Date of Patent: Apr. 26, 2016

(54) DIELECTRIC COMPOSITION, AND MULTILAYERED CERAMIC CAPACITOR INCLUDING THE SAME AS DIELECTRIC LAYER

(71) Applicant: SAMSUNG ELECTRO-MECHANICS CO., LTD., Suwon-si, Gyunggi-do (KR)

(72) Inventors: Ki Hyun Park, Busan (KR); Jeong Hyun Park, Busan (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 141 days.

(21) Appl. No.: 14/139,240

(22) Filed: Dec. 23, 2013

(65) Prior Publication Data
US 2014/0177130 A1 Jun. 26, 2014

(30) Foreign Application Priority Data

Dec. 26, 2012 (KR) ......................... 10-2012-0153368

(51) Int. Cl.
*C04B 35/00* (2006.01)
*H01G 4/12* (2006.01)
(Continued)

(52) U.S. Cl.
CPC ............ *H01G 4/1254* (2013.01); *C04B 35/495* (2013.01); *C04B 35/62685* (2013.01); *H01G 4/1227* (2013.01); *H01G 4/30* (2013.01); *C04B 2235/3208* (2013.01); *C04B 2235/3213* (2013.01); *C04B 2235/3215* (2013.01);
(Continued)

(58) Field of Classification Search
CPC ..... H01G 4/12; H01G 4/1209; H01G 4/1218; H01G 4/1227; H01G 4/1236; H01G 4/1245; C04B 35/46; C04B 35/462; C04B 35/465; C04B 35/468; C04B 35/4682; C04B 35/4686; C04B 35/47; C04B 35/48; C04B 35/491
USPC ................. 501/134, 135, 136, 137, 138, 139; 361/321.4, 321.2
See application file for complete search history.

(56) References Cited

U.S. PATENT DOCUMENTS

2007/0120164 A1* 5/2007 Fukui et al. .................... 257/295
2009/0201628 A1* 8/2009 Kagata et al. .............. 361/321.4
2011/0128669 A1* 6/2011 Yano et al. .................... 361/312

FOREIGN PATENT DOCUMENTS

JP 2004-075486 A 3/2004

OTHER PUBLICATIONS

Francombe. The Relation between Structure and Ferroelectricity in Lead Barium and Barium Strontium Niobates. Acta Cryst. (1960). 13, 131-140.*

(Continued)

*Primary Examiner* — Noah Wiese
(74) *Attorney, Agent, or Firm* — McDermott Will & Emery LLP

(57) ABSTRACT

Disclosed herein are a dielectric composition including a compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: 1<x<5) as a main component and a multilayered ceramic capacitor including the same as a dielectric layer.

15 Claims, 2 Drawing Sheets

(51) Int. Cl.
  *H01G 4/30* (2006.01)
  *C04B 35/495* (2006.01)
  *C04B 35/626* (2006.01)
  *H01G 4/008* (2006.01)
(52) U.S. Cl.
  CPC . *C04B2235/3239* (2013.01); *C04B 2235/3251* (2013.01); *C04B 2235/3281* (2013.01); *C04B 2235/3409* (2013.01); *C04B 2235/365* (2013.01); *H01G 4/0085* (2013.01)

(56) References Cited

OTHER PUBLICATIONS

Sakamoto et al. Synthesis and Properties of Highly Oriented (Sr, Ba)(Nb, Ta)2O6 Thin Films by Chemical Solution Deposition. Jpn. J. Appl. Phys. vol. 40 (2001) pp. 5599-5604.*

* cited by examiner

DIELECTRIC COMPOSITION, AND MULTILAYERED CERAMIC CAPACITOR INCLUDING THE SAME AS DIELECTRIC LAYER

CROSS REFERENCE(S) TO RELATED APPLICATIONS

This application claims the foreign priority benefit under 35 U.S.C. Section 119 of Korean Application No. 10-2012-0153368, entitled "Dielectric Composition, and Multilayered Ceramic Capacitor Including the Same as Dielectric Layer" filed on Dec. 26, 2012, which is hereby incorporated by reference in its entirety into this application.

BACKGROUND OF THE INVENTION

1. Technical Field

The present invention relates to a dielectric composition, and a multilayered ceramic capacitor including the same as a dielectric layer.

2. Description of the Related Art

In general, electronic components using ceramic materials, such as a capacitor, an inductor, a piezoelectric element, a varistor, or a thermistor, or the like, include a ceramic element made of a ceramic material, internal electrodes formed in the ceramic element, and external electrodes mounted on a surface of the ceramic element so as to be connected to the internal electrodes, and refer to a multilayered ceramic electronic component using a thick film ceramic multilayered technology. Among the chip components, the multilayered ceramic capacitor has been widely used as components for a mobile communications device such as computers, personal digital assistants (PDAs), mobile phones, or the like, due to advantages such as a small size, high capacitance, easiness of mounting, or the like.

The multilayered ceramic capacitor is generally manufactured by multilayering a paste for an internal electrode layer and a paste for a dielectric layer by a sheet method, a printing method, and the like, and performing a co-firing process. However, at the time of performing the firing process under a reduction atmosphere, a dielectric material used in the existing multilayered ceramic capacitor, or the like, is reduced to be a semiconductor.

Therefore, precious metals such as Pd, and the like, which are not molten at a temperature at which the dielectric material is sintered, and are not oxidized even though the firing process is performed under a high oxygen partial pressure not allowing the dielectric material to be a semiconductor have been used as a material of the internal electrode.

However, since the precious metals such as Pd, and the like, are expensive, the multilayered ceramic capacitor made of the precious metals has difficulty in reducing the price. Therefore, as the material for the internal electrode, non-metals such as nickel (Ni), a nickel alloy, and the like, that are relatively cheap have been mainly used.

In addition, in the case in which the non-metal is used as a conductive material of the internal electrode layer, when the firing process is performed in the atmosphere, the internal electrode layer is oxidized, such that the co-firing process of the dielectric layer and the internal electrode layer should be performed under the reduction atmosphere.

In general, in the case in which the firing process is performed under the reduction atmosphere, the dielectric layer is reduced, such that an insulation resistance (IR) is decreased. Therefore, a non-reductive dielectric material has been suggested, and a dielectric magnetic composition for temperature compensation having a small change in temperature of electrostatic capacitance, and arbitrarily controllable at a range of −150 to +150 ppm/° C. has been increasingly demanded.

(Ca,Sr) (Ti,Zr)$O_3$ composition has been mostly and widely used as the dielectric composition for temperature compensation in the related art. Referring to FIG. 1 showing a change in a temperature coefficient of capacitance and the following Table 1 showing a method showing properties according to the temperature coefficient of capacitance, a solid solution having stable temperature coefficient regardless of COG type temperature may be formed, and a dielectric constant and the temperature coefficient of capacitance may be changed depending on a composition ratio of $Ca^{2+}$ and $Sr^{2+}$ ions and $Ti^{4+}$ and $Zr^{4+}$ ions.

TABLE 1

| Temperature coeff. | | | | Tolerance | |
|---|---|---|---|---|---|
| ppm/° C. | Sym. | Exponent | Sym. | ppm/° C. | Sym. |
| 0.0 | C | −1 | 0 | ±30 | G |
| 1.0 | M | −10 | 1 | ±60 | H |
| 1.5 | P | −100 | 2 | ±120 | J |
| 2.2 | R | −1000 | 3 | ±250 | K |
| 3.3 | S | −10000 | 4 | ±500 | L |
| 4.7 | T | +1 | 5 | ±1000 | M |
| 7.5 | U | +10 | 6 | ±2500 | N |
|  |  | +100 | 7 |  |  |
|  |  | +1000 | 8 |  |  |
|  |  | +10000 | 9 |  |  |

It is generally well known that when $Ca^{2+}$ and $Zr^{4+}$ are added more than $Sr^{2+}$ and $Ti^{4+}$, the dielectric constant is decreased and the temperature coefficient is stable, but in contrast, when $Sr^{2+}$ and $Ti^{4+}$ are added more than $Ca^{2+}$ and $Zr^{4+}$, the dielectric constant is increased while the temperature coefficient is rapidly changed.

More specifically, the dielectric constant and the temperature coefficient of capacitance in the composition has a dielectric constant of 30 to 340 and a temperature coefficient of capacitance of 0~−3400 ppm/° C. depending on ratio of Ca/Sr and Zr/Ti, and as the temperature coefficient of capacitance becomes stabilized, the dielectric constant is small, less than 50.

RELATED ART DOCUMENT

Patent Document (Patent Document 1) Japanese Patent Laid-Open Publication No. 2004-075486

SUMMARY OF THE INVENTION

An object of the present invention is to provide a dielectric composition having a small change in a temperature of an electrostatic capacitance, a high dielectric constant, and excellent high temperature reliability.

In addition, another object of the present invention is to provide a multilayered ceramic capacitor including the dielectric composition as a dielectric layer.

According to an exemplary embodiment of the present invention, there is provided a dielectric composition including a compound represented by the following chemical formula $A_{5-x}B_{10}O_{30-x}$ as a main component, wherein A necessarily includes Ba, and a portion of Ba is substituted by at least one selected from Sr and Ca; B necessarily includes Nb, and a portion of Nb is substituted by at least one selected from Ta and V, and x satisfies the following equation: $1<x<5$.

In the case in which the portion of Ba is substituted by at least one selected from Sr and Ca, Sr or Ca may be substituted so as to satisfy the following range: $0<y<1$.

In the case in which the portion of Nb is substituted by Ta, Ta may be substituted so as to satisfy the following range: $0<z\leq 1$.

In the case in which the portion of Nb is substituted by V, V may be substituted so as to satisfy a range of 0.2 or less.

A dielectric constant may be 80 to 310 and a dielectric loss may be 0.004 to 0.071 between a frequency of 1 to 10,000 KHz, and a dielectric constant may be 75 to 300 and a dielectric loss may be 0.001 to 0.007 between a frequency of 1 to 100 MHz.

Y5V or X5R characteristics defined by the EIA standards may be satisfied.

The dielectric composition may be fired at a temperature range of 1100 to 1300.

The dielectric composition may further include at least one selected from a glass frit, $V_2O_5$, CuO, $B_2O_3$ and $BiVO_3$ as a low temperature sintering agent.

The low temperature sintering agent may be included in a content of 1 to 10 wt % based on the total dielectric composition.

The low temperature sintering agent may include at least one selected from $ZnO$—$B_2O_3$—$SiO_2$, $Li_2O$—$B_2O_3$—$SiO_2$ and $CaO$—$B_2O_3$—$SiO_2$ as a main component.

The low temperature sintering agent may further include at least one selected from $Al_2O_3$, $Na_2O$, $K_2O$ and $P_2O_5$.

The dielectric composition including the low temperature sintering agent may be sintered at a temperature of 1000 to 1100.

According to another exemplary embodiment of the present invention, there is provided a multilayered ceramic capacitor manufactured by multilayering internal electrodes and dielectric layers, wherein the dielectric layer uses a dielectric composition including a compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: $1<x<5$) as a main component.

The internal electrode may be nickel or a nickel alloy.

The dielectric layer and the internal electrode may be co-fired.

DESCRIPTION OF THE PREFERRED EMBODIMENTS

Figure 1:
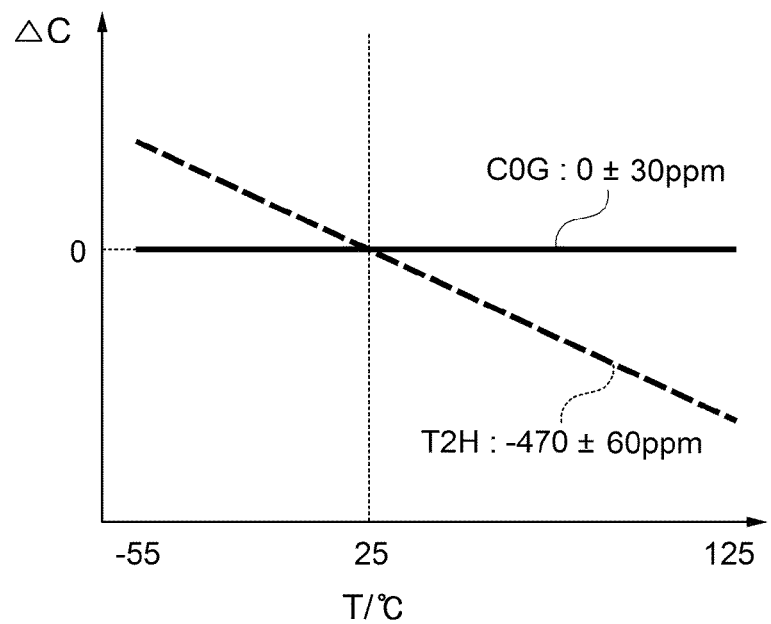
FIG. 1 is a graph showing a change in a temperature coefficient of capacitance depending on a temperature.

Hereinafter, the present invention will be described in more detail.

Terms used in the present specification are for explaining the embodiments rather than limiting the present invention. Unless explicitly described to the contrary, a singular form may include a plural form in the present specification. In addition, the word "comprise" and variations such as "comprises" or "comprising," used in the present specification will be understood to imply the inclusion of stated shapes, figures, steps, operations, members, elements and/or groups thereof but not the exclusion of any other shapes, figures, steps, operations, member, element and/or groups thereof.

The present invention relates to a composition overcoming a low dielectric constant which is disadvantageous of $(Ca,Sr)(Ti,Zr)O_3$, having a stable temperature coefficient of capacitance and a dielectric constant of 70 or more.

The dielectric composition according to an exemplary embodiment of the present invention may include a compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: $1<x<5$) as a main component.

A range of x in Chemical Formula above is preferred to be more than 1 and less than 5, and in the case in which x satisfies the above-described range, a main crystalline phase preferably has a crystalline structure in a tetragonal tungsten bronze (TTB) type and an anti-ferroelectric property.

In addition, the dielectric composition according to the exemplary embodiment of the present invention including the compound represented by the following chemical formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: $1<x<5$) as a main component may have improved dielectric properties and improved sintered properties achieved by the following methods.

In the chemical formula above, the portion of Ba at A site may be substituted by at least one selected from Sr and Ca, wherein Sr or Ca may be substituted so as to satisfy the following range: $0<y<1$. In the case in which Sr or Ca is substituted so as to satisfy the following range: $0<y<1$, a lattice torsion occurs, such that the dielectric constant may be increased to obtain high dielectric constant property and a dielectric loss may be deteriorated to obtain dielectric ceramics having high quality coefficient.

More specifically, since it is general that Sr shows paraelectricity of 0.75 or more, and Ca shows paraelectricity of 0.5 or more, the dielectric constant and the dielectric loss are deteriorated beyond the above-described range showing paraelectricity.

In addition, the portion of Nb in B site in chemical formula above may be substituted by at least one selected from Ta and V, wherein Ta may be substituted so as to satisfy the following range: $0<z\leq 1$. In the above-described range, high dielectric constant and high quality coefficient may be provided to improve the dielectric properties. Since Ta has a lattice structure and an ionic radius similar to those of Nb, Ta may be easily substituted.

Further, in the case in which the portion of Nb is substituted by V, a sintering temperature is deteriorated depending on a substituted content; however, in the case in which the substituted content of V is more than 0.2, since diffusion is extremely generated at the time of co-firing of electrodes and a ceramic body, the substituted content of V is appropriate to be 0.2 or less, and as the substituted content of V becomes increased, the dielectric property is deteriorated, but the sintering process may be achieved at a temperature of 1150° C. or less.

The main crystalline phase of the compound represented by the Chemical Formula above according to the exemplary embodiment of the present invention, which is a $Ba_3Nb_{10}O_{28}$ phase, is a crystalline phase having a crystalline structure in a tetragonal tungsten bronze (TTB) type and an anti-ferroelectric property.

The main component represented by the Chemical Formula above may be included in a content of 30 to 100 wt % based on the total dielectric composition, and in the case in which the content is less than 30 wt %, the dielectric constant is decreased to be 70 or less, and various secondary phase and non-synthesized phase exist to deteriorate the dielectric property, which is not preferred.

In addition, the dielectric composition according to the exemplary embodiment of the present invention has the dielectric constant of 80 to 310 and the dielectric loss of 0.004 to 0.071 between a frequency of 1 to 10,000 KHz, and the dielectric constant of 75 to 300 and the dielectric loss of 0.001 to 0.007 between a frequency of 1 to 100 MHz.

(Ca,Sr) (Ti,Zr)$O_3$ according to the related art is a material having non-sinterability which is sintered at a temperature of 1300° C. or more; however, the main component of the dielectric composition according to the exemplary embodiment of the present invention may be sintered at a temperature range of 1100 to 1300° C.

In addition, the dielectric composition according to the exemplary embodiment of the present invention may be fired under a reduction atmosphere. In the case in which the dielectric composition according to the related art is fired under the reduction atmosphere, the dielectric layer is reduced and an insulation resistance (IR) is decreased; however, since the dielectric composition according to the exemplary embodiment of the present invention has a non-reductive property, problems that the IR is decreased at the time of firing under the reduction atmosphere may be solved.

Further, the dielectric composition according to the exemplary embodiment of the present invention may satisfy the Y5V or X5R characteristics defined by the EIA standards. The Y5V characteristics satisfy that an operating temperature is −30 to +85° C. and a temperature property is +22 to −82%. In addition, the X5R characteristics satisfy that an operating temperature is −55 to +85° C. and a temperature property is ±15%.

Therefore, the dielectric composition according to the exemplary embodiment of the present invention may provide a multilayered ceramic capacitor showing stable property even at a high temperature.

In addition, the dielectric composition according to the exemplary embodiment of the present invention may include at least one low temperature sintering agent selected from a glass frit, $V_2O_5$, CuO, $B_2O_3$ and $BiVO_3$ in a small content of 1 to 10 wt % based on the total dielectric composition.

More specifically, the low temperature sintering agent may include at least one selected from $ZnO$—$B_2O_3$—$SiO_2$, $Li_2O$—$B_2O_3$—$SiO_2$ and $CaO$—$B_2O_3$—$SiO_2$ as a main component, and further include at least one selected from $Al_2O_3$, $Na_2O$, $K_2O$ and $P_2O_5$.

The low temperature sintering agent is added to the dielectric composition according to the exemplary embodiment of the present invention, such that a firing temperature is decreased up to 1000 to 1100° C.

In addition, the present invention relates to a multilayered ceramic capacitor manufactured by multilayering internal electrodes and dielectric layers, wherein the dielectric layer uses the dielectric composition including a compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: 1<x<5) as a main component.

The multilayered ceramic capacitor according to the exemplary embodiment of the present invention may include the dielectric composition as the dielectric layer to have high dielectric constant and excellent temperature property.

The internal electrode in the multilayered ceramic capacitor may be nickel or a nickel alloy.

In addition, it is preferred that the ceramic element and the internal electrodes are co-fired in the multilayered ceramic capacitor according to the exemplary embodiment of the present invention.

Hereinafter, exemplary embodiments of the present invention will be described in detail. The examples below are described by way example, and are not to be construed as limiting a scope of the present invention. In addition, the examples below are exemplified using specific compounds, but it is obvious to a person skilled in the art that effects obtained by using equivalents thereof can be the same as or similar to those of the present invention.

EXAMPLE 1

Each dielectric composition was prepared by using a compound represented by the following equation: $A_{5-x}B_{10}O_{30-x}$ as a main component, but changing the x value as shown in the following Table 2, and adding $V_2O_5$ in a content of 3 wt % as a low temperature sintering agent.

TABLE 2

| Main Component | Dielectric Constant (@1 MHz) | Dielectric Loss (@1 MHz) |
|---|---|---|
| $Ba_4Nb_{10}O_{29}$ | 294 | 0.007 |
| $Ba_3Nb_{10}O_{28}$ | 206 | 0.001 |
| $Ba_2Nb_{10}O_{27}$ | 115 | 0.001 |
| $BaNb_{10}O_{26}$ | 79 | 0.003 |

Experimental Example 1

Confirmation of Fracture Surface Structure after Sintering

Figure 2:
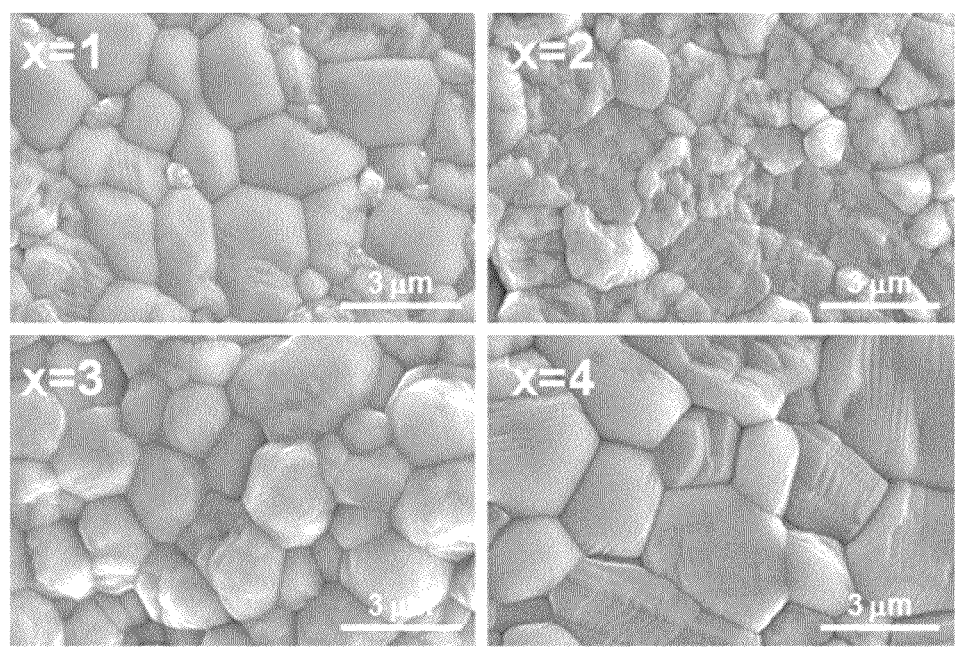
FIG. 2 is scanning electron microscope (SEM) photographs showing fracture surfaces measured by changing x values after sintering a dielectric composition prepared by an exemplary embodiment of the present invention.

After each dielectric composition prepared by Example 1 above was sintered at a temperature of 1200° C., a fracture surface thereof was measured using a scanning electron microscope (SEM), and results thereof were shown in FIG. 2.

It may be appreciated from FIG. 2 that the composition was densified with little pores.

Experimental Example 2

Dielectric Properties Measurement Depending on Temperature

Figure 3A:
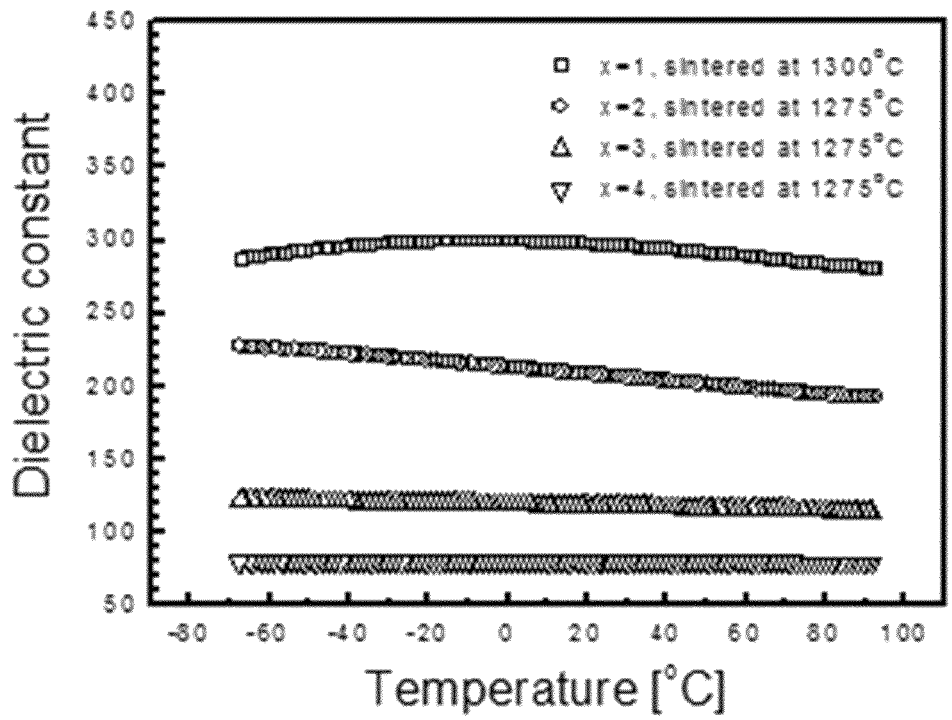
FIG. 3 is a graph showing a dielectric constant (a) and a dielectric loss (b) depending on x values in the main component chemical formula of the dielectric composition prepared by the exemplary embodiment of the present invention.
Figure 3B:
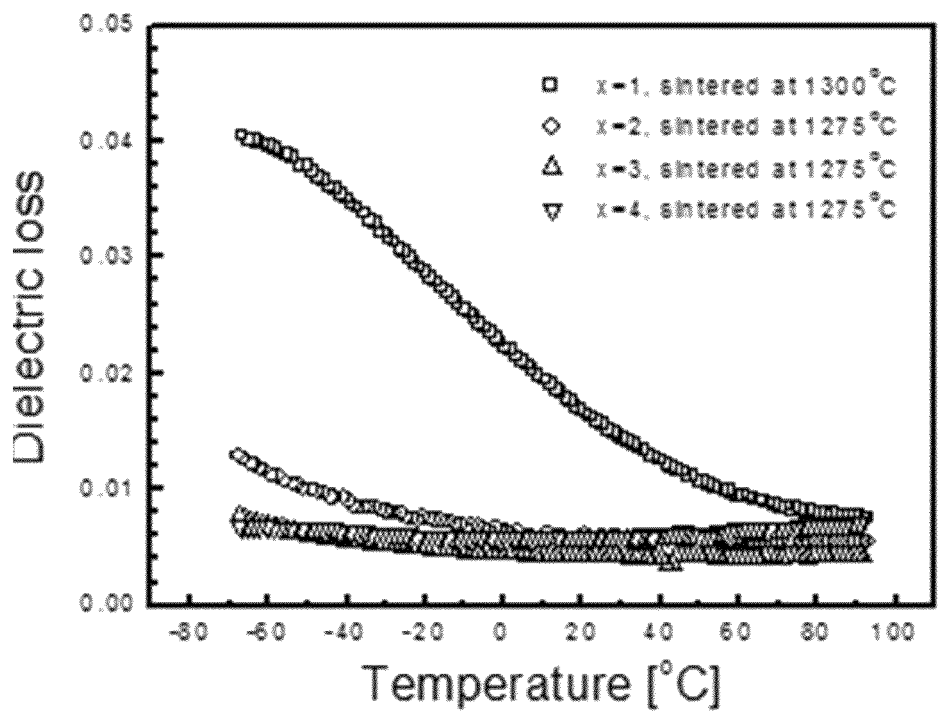

Dielectric properties (a: dielectric constant, b: dielectric loss) of each dielectric composition prepared by Experimental Example 1 depending on a temperature were measured using 4194A from the Agilent Company at a frequency band of 1000 KHz, and results thereof were shown in FIGS. 3(a) and 3(b).

As shown in FIGS. 3(a) and 3(b), as x in the following Chemical Formula $Ba_{5-x}B_{10}O_{30-x}$ becomes increased, the dielectric constant was deteriorated but the temperature coefficient of capacitance was stably maintained regardless of temperature.

In addition, in the dielectric composition including the following Chemical Formula $Ba_{5-x}B_{10}O_{30-x}$ as a main component according to the exemplary embodiment of the present invention, the dielectric constant was measured to be 80 to 310, and the dielectric loss was measured to be 0.004 to 0.071, at a frequency of 1000 KHz.

Further, it was confirmed from Table 2 above that in the case of measuring 1 MHz band using 4284A from the Agilent Company, the dielectric constant was 79 to 294, and the dielectric loss was 0.001 to 0.007.

According to the exemplary embodiments of the present invention, the dielectric composition having small change in the temperature of the electrostatic capacitance, high dielectric constant, and excellent high temperature reliability may be prepared. Therefore, the multilayered ceramic capacitor including the dielectric composition as the dielectric layer may have high dielectric constant and excellent high temperature reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A dielectric composition comprising a compound represented by the following Chemical Formula $A_{5-x}B_{10}O_{30-x}$ as a main component, further comprising at least one selected from a glass frit, $V_2O_5$, CuO, $B_2O_3$ and $BiVO_3$ as a low temperature sintering agent, wherein A necessarily includes Ba, and a portion of Ba is substituted by at least one selected from Sr and Ca;

B necessarily includes Nb, and a portion of Nb is substituted by at least one selected from Ta and V, and x satisfies the following equation: $1<x<5$.

2. The dielectric composition according to claim 1, wherein in the case in which the portion of Ba is substituted by at least one selected from Sr and Ca, Sr or Ca is substituted so as to satisfy the range of (0, 1).

3. The dielectric composition according to claim 1, wherein in the case in which the portion of Nb is substituted by Ta, Ta is substituted so as to satisfy the range of (0, 1).

4. The dielectric composition according to claim 1, wherein in the case in which the portion of Nb is substituted by V, V is substituted so as to satisfy a range of 0.2 or less based on 1 mole of $A_{5-x}B_{10}O_{30-x}$.

5. The dielectric composition according to claim 1, wherein a dielectric constant is 80 to 310 and a dielectric loss is 0.004 to 0.071 between a frequency of 1 to 10,000 KHz, and a dielectric constant is 75 to 300 and a dielectric loss is 0.001 to 0.007 between a frequency of 1 to 100 MHz.

6. The dielectric composition according to claim 1, wherein Y5V or X5R characteristics defined by the EIA standards are satisfied.

7. The dielectric composition according to claim 1, wherein the compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: $1<x<5$) is included in a content of 30 to 100 wt % based on the total dielectric composition.

8. The dielectric composition according to claim 1, wherein it is fired at a temperature range of 1100 to 1300° C.

9. The dielectric composition according to claim 1, wherein the low temperature sintering agent is included in a content of 1 to 10 wt % based on the total dielectric composition.

10. The dielectric composition according to claim 1, wherein the low temperature sintering agent includes at least one selected from $ZnO-B_2O_3-SiO_2$, $Li_2O-B_2O_3-SiO_2$ and $CaO-B_2O_3-SiO_2$ as a main component.

11. The dielectric composition according to claim 1, wherein the low temperature sintering agent further includes at least one selected from $Al_2O_3$, $Na_2O$, $K_2O$ and $P_2O_5$.

12. The dielectric composition according to claim 1, wherein it is sintered at a temperature of 1000 to 1100° C.

13. A multilayered ceramic capacitor manufactured by multilayering internal electrodes and dielectric layers, wherein the dielectric layer uses a dielectric composition including a compound represented by the following Chemical Formula $A_{5-x}B_{10}O_{30-x}$ (A necessarily includes Ba, and a portion of Ba is substituted by at least one selected from Sr and Ca; B necessarily includes Nb, and a portion of Nb is substituted by at least one selected from Ta and V; and x satisfies the following equation: $1<x<5$) as a main component, wherein the dielectric composition further comprises at least one selected from a glass fit, $V_2O_5$, CuO, $B_2O_3$ and $BiVO_3$ as a low temperature sintering agent.

14. The multilayered ceramic capacitor according to claim 13, wherein the internal electrode is nickel or a nickel alloy.

15. The multilayered ceramic capacitor according to claim 13, wherein the dielectric layer and the internal electrode are co-fired.

* * * * *